(12) United States Patent
Heise et al.

(10) Patent No.: US 6,641,168 B2
(45) Date of Patent: Nov. 4, 2003

(54) CROSS MEMBER AS PART OF A MOTOR-VEHICLE FLOOR ASSEMBLY

(75) Inventors: Wilfried Heise, Tübingen (DE); Achim Hoffmann, Sindelfingen (DE); Joachim Ruhs, Böblingen (DE); Jörg Sikorski, Stuttgart (DE); Jens Peter Weber, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 35 days.

(21) Appl. No.: 09/852,679

(22) Filed: May 11, 2001

(65) Prior Publication Data
US 2002/0008409 A1 Jan. 24, 2002

(30) Foreign Application Priority Data
May 11, 2000 (DE) .......................... 100 22 916

(51) Int. Cl.[7] .............................. B62D 21/00
(52) U.S. Cl. ...................... 280/781; 180/311
(58) Field of Search ................ 280/781, 785, 280/787, 788; 180/311; 296/204, 203.04

(56) References Cited

U.S. PATENT DOCUMENTS

| | | | |
|---|---|---|---|
| 5,567,005 A | * 10/1996 | Kosuge et al. | ............. 296/204 |
| 5,580,121 A | * 12/1996 | Dange et al. | ............. 296/204 |
| 6,109,653 A | * 8/2000 | Maruyama et al. | ......... 280/781 |
| 6,547,281 B1 | * 4/2003 | Iwatsuki | .................. 280/785 |

FOREIGN PATENT DOCUMENTS

| | | | |
|---|---|---|---|
| DE | 3924973 | 2/1990 | |
| DE | 19507767 | 10/1996 | |
| DE | 19651627 | 6/1998 | |
| DE | 19726721 | 10/1998 | |
| JP | 4-90975 | * 3/1992 | ................. 280/788 |

* cited by examiner

*Primary Examiner*—Eric Culbreth
(74) *Attorney, Agent, or Firm*—Crowell & Moring LLP

(57) ABSTRACT

A cross member as part of a motor-vehicle floor assembly is provided which, on both sides, comprises an attachment region for the screwing on of a rear axle unit, and a spring-receiving region which is adjacent to the attachment region and is intended for the fixing in place of a helical spring. In order to be able to absorb in a specific manner the compression and bending stresses introduced in the attachment and spring-receiving region, the cross member is provided with a stiffening structure of additional metal plates, the stiffening structure being used to obtain a local increase in the stiffening and strength of these regions. The stiffening structure is formed by extruded and bent steel plates which are nested one into another like boxes and are connected to one another and to the base and side walls of the cross member by spot welding. This box structure enables the screw-on intersecting point to be adjusted with respect to the rear axle in the body shell in the X- and Y-directions. This stiffening structure can be welded into the cross member with little manufacturing outlay and fulfils the stiffness requirements placed on the connecting region.

12 Claims, 3 Drawing Sheets

CROSS MEMBER AS PART OF A MOTOR-VEHICLE FLOOR ASSEMBLY

BACKGROUND AND SUMMARY OF THE INVENTION

This application claims the priority of German application 100 22 916.6, filed on May 11, 2000, the disclosure of which is expressly incorporated by reference herein.

The invention relates to a cross member as part of a motor-vehicle floor assembly which, on both sides, has a connecting region which comprises an attachment region for the attachment of a rear axle unit and a spring-receiving region which is adjacent to the attachment region and is intended for the fixing in place of a helical spring. The cross member is provided with a stiffening structure in the connecting region.

A cross member of this type is known, for example, in the series vehicle construction of the C-class of Mercedes-Benz. The cross member has, on both sides, connecting regions for the attachment of the rear axle, and for the fixing in place of the rear axle spring struts. The connecting regions therefor firstly have attachment regions to which the rear axle unit is screwed in its rear coupling point, and secondly receiving shells to which are attached spring plates for receiving helical springs which are used to support the rear axle unit with respect to the cross member. During operation of the vehicle, rear axle forces and spring forces are introduced into the connecting regions of the cross member, which results in high bending loads in these regions. In order to obtain a local increase in the stiffening and strength, the connecting regions are reinforced by a plurality of additional metal plates which span the base and the upper edge of the cross member in the connecting region and are welded to the latter via MAG welding seams. These additional metal plates, which are connected linearly to the cross member, therefore form reinforcing ribs which result in a specific increase in stiffness of the connecting regions.

However, in terms of manufacturing engineering, the linear welding of the reinforcing metal plate to the cross member signifies a considerable additional outlay on the production of the floor assembly: this is because, whereas otherwise only spot welding is used for connecting the individual metal plates to the floor assembly, for the attachment of the reinforcing metal plates, a seam-welding process is required which is associated with the use of additional welding apparatuses (for example, MAG welding robots) and in consequence incurs considerable additional costs. Furthermore, in the case of metal plates having a heat-treated surface, the MAG welding can be used only to a limited extent, since—depending on the type of surface coating—the MAG welding can result in the heat-treated layer being burnt away and therefore in a substantially increased susceptibility of the metal plates to corrosion.

An object of the invention is therefore based on developing the known cross member in such a manner that a specific, local increase in the stiffness and strength of the connecting regions is obtained and, at the same time, the disadvantages associated with seam welding are avoided. Furthermore, the connecting regions are to be designed in such a manner that a highly precise alignment of the rear axle unit with respect to reference points on the cross member is made possible.

According to the invention, this object is achieved by the stiffening structure being of box-shaped design and spanning both the attachment region and the spring-receiving region and in that the stiffening structure is connected to the cross member by means of spot welding.

In certain preferred embodiments of the invention, the connecting region is reinforced with a box-shaped stiffening structure which spans both the attachment region and the spring-receiving region and which is connected to the cross member with the aid of a spot-welding process. Because of its box shape, the stiffening structure—although it is only connected at points to the cross member—brings about an increase in the strength of the connecting region. The increase is many times higher than the conventional increase in strength obtained by seam-welded additional metal plates. Therefore, the refinement according to such embodiments of the invention of the connecting region firstly obtains a significant increase in the strength of this heavily loaded zone and secondly, the putting in place of the stiffening structure is substantially less complicated in terms of manufacturing engineering and therefore more cost-effective to bring about. The stiffening structure can be fitted in the cross member with the aid of the point welding used throughout in the vehicle body shell, and so, an additional welding process is not necessary for this type of stiffening. As a result, the outlay on apparatus for joining together the floor assembly is considerably reduced.

According to certain preferred embodiments of the invention, the reinforcing structure expediently comprises a basic element and a stiffening element, the basic element overlapping in the attachment region in a planar manner over the base of the cross member and having two side walls which protrude approximately perpendicularly with respect to the attachment region, while the stiffening element is of U-shaped design and overlaps in a planar manner both over the side walls of the basic element and over the side walls of the cross member. The basic element is used for the specific reinforcing of the attachment region and is connected thereto by welding points. The stiffening element forms a clasp-like reinforcement of the cross member to whose side walls it is connected, and also, because of its planar connection to the side walls of the basic element, brings about a stiffening connection between the basic element and the side walls of the cross member. The stiffening structure therefore comprises just two individual parts which are placed into the cross member without an additional outlay and are connected thereto by spot welding. Therefore it constitutes a very simple and good-value alternative to conventional stiffening means.

According to certain preferred embodiments of the invention, the welding points which connect the reinforcing element to the basic element and the side walls of the cross member are situated on surfaces which lie approximately perpendicularly with respect to the base of the cross member (and therefore with respect to the attachment region and the spring-receiving region); therefore, when the cross member is subjected to bending and compression loading, primarily shearing forces and only very slight tensile forces act on these welding points, which ensures that these welding connections have great durability and load-bearing capacity—even when subjected to large bending moments.

Furthermore, one of the side arms of the U-shaped stiffening element is expediently designed, in certain preferred embodiments, as a projecting lever in the form of a metal plate which overlaps both over the attachment region and over the spring-receiving region and is arranged approximately perpendicularly with respect to the spring-receiving region. This lever is connected in the attachment region to a side wall of the basic element and in the spring-receiving region to the cross member by welding points; the lever therefore couples together the two regions, in which compression and bending moments are introduced into the cross member, in such a manner that a favorable combining of the different compression and bending forces is achieved. The stiffening structure therefor achieves integration and partial compensation of the spring and axle forces. In order to ensure that the attachment region is coupled to the spring-receiving region in as stable a manner as possible, it is recommended to provide the lever with a stiffening bead which spans both the attachment region and the spring-receiving region.

According to certain preferred embodiments of the invention, the stiffening element is a sheet-metal bending part, since a part of this type can be manufactured at good value and in a simple manner. In order to increase the strength of the stiffening structure, it is advantageous to provide the stiffening element with notched angular stiffening areas in the region of the bending edges.

According to certain preferred embodiments of the invention, the basic element is expediently an extruded part with a thread formed integrally on it for receiving the rear axle unit. The threaded connecting branch is designed such that it interacts with an adapter on the rear axle in such a manner that there is an optimum introduction of force from the rear axle to the cross member with the welding points, which connect the basic element to the cross member, being subjected only to a minimal tensile load.

In order to ensure that the cross member is effectively resistant to corrosion, it is advantageous, according to certain preferred embodiments, to manufacture the cross member and the stiffening structure from zinc-coated steel plate. Since the individual parts are connected by way of spot welding, the coating is preserved during the joining process, with the result that no subsequent or additional corrosion protection has to be provided.

According to certain preferred embodiments of the invention, a stiffening structure comprising a basic element and a stiffening element nested into the basic element furthermore enables the rear axle (which is to be screwed onto the basic element) to be aligned in a highly precise manner with regard to reference points on the cross member.

According to certain preferred embodiments, the basic element and the stiffening element are first of all placed together into the cross member. The basic element is then displaced with respect to the cross member in such a manner that the rear axle screwing-on point on the basic element comes to lie at a predetermined position with respect to a fixing point on the cross member; in this position, the basic element is connected to the cross member by welding points. The stiffening element is then displaced with respect to the basic element in such a manner that its central part comes to lie flat against a side wall of the cross member, and in this position is connected to the basic element and the cross member by welding points. This installation method firstly permits a flexible, highly precise alignment of the basic element (and of the screw-on point of the rear axle unit) with respect to the cross member; and secondly, it is ensured by way of the subsequent alignment of the stiffening element with respect to the basic element and the cross member that—irrespective of dimensional inaccuracies of the cross member—good stiffening of the connecting region is ensured.

Other objects, advantages and novel features of the present invention will become apparent from the following detailed description of the invention when considered in conjunction with the accompanying drawings.

DETAILED DESCRIPTION OF THE DRAWINGS

Figure 1:
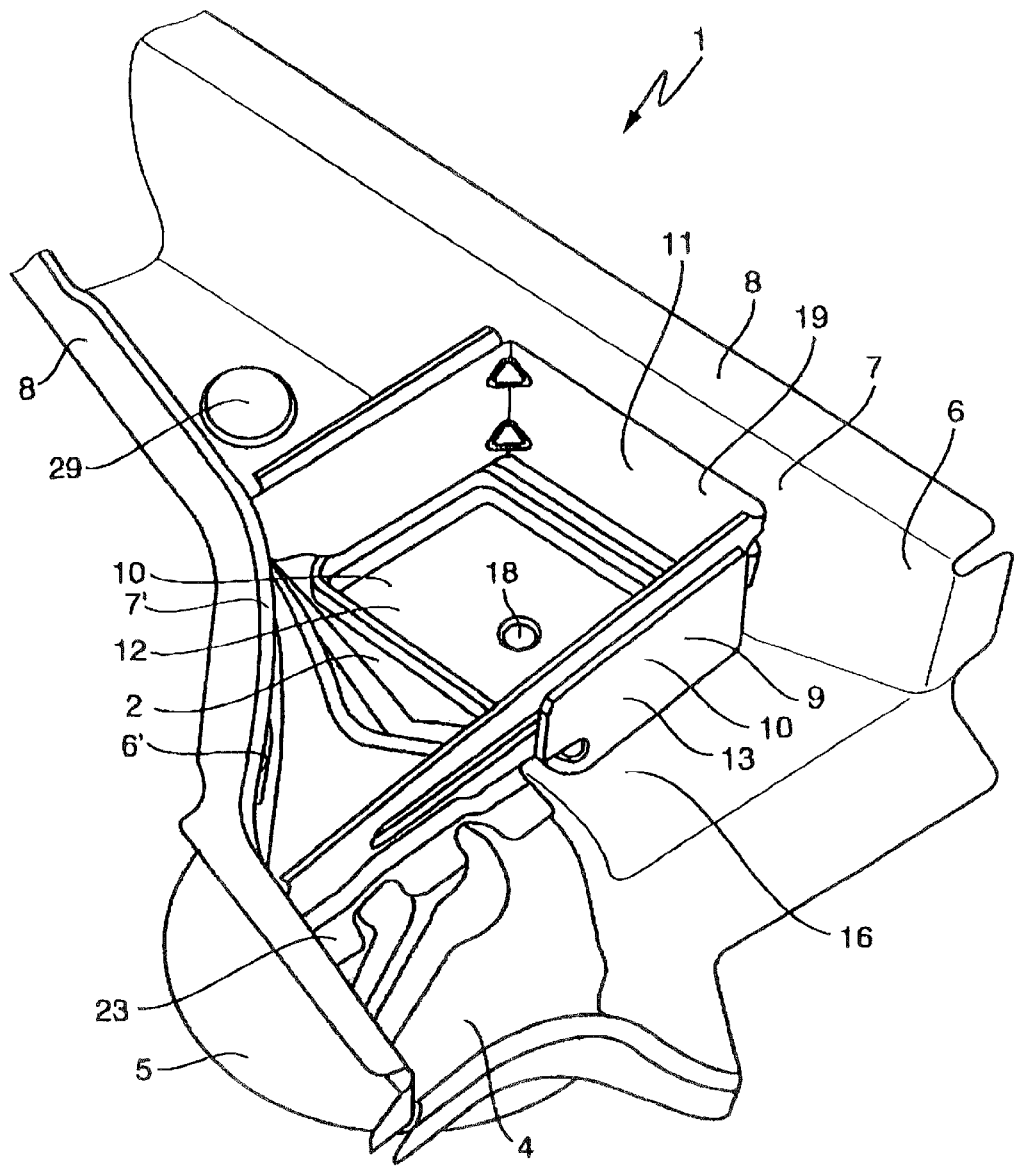
FIG. 1 shows a perspective view of a cross member with a stiffening structure.

FIG. 1 shows a cutout of a cross member 1 which, on the left and right, has an attachment region 2 onto which a rear axle unit (not illustrated in FIG. 1) is screwed. The cross member 1 has the form of an upwardly open U-profile and is (as can be seen from FIG. 3) provided in the attachment regions 2 with leadthroughs 3 for attachment screws 36 for the connection of the rear axle unit. The cross member 1 furthermore contains, on both sides, a spring-receiving region 4 to which a respective spring plate 5 is attached for the purpose of receiving a helical spring (not shown in the figures) which is used to support the rear axle unit with respect to the cross member 1. The side walls 6, 6' of the cross member 1 are provided in their upper region 7, 7' with welding flanges 8 at which the cross member 1 is welded to a floor plate (not illustrated in FIG. 1).

During the driving operation of the vehicle, the cross member 1 is subjected to high bending and compression moments which are introduced into the cross member 1, on the one hand, via the rear coupling points of the rear axle gear mechanism and, on the other hand, via the helical springs. The cross member 1 must therefore be reinforced and stiffened locally in the attachment regions 2 and the spring-receiving regions 4. For this purpose, the cross member 1 is provided with a box-shaped stiffening structure 9 which includes a basic element 10 and a stiffening element 11.

Figure 2A:
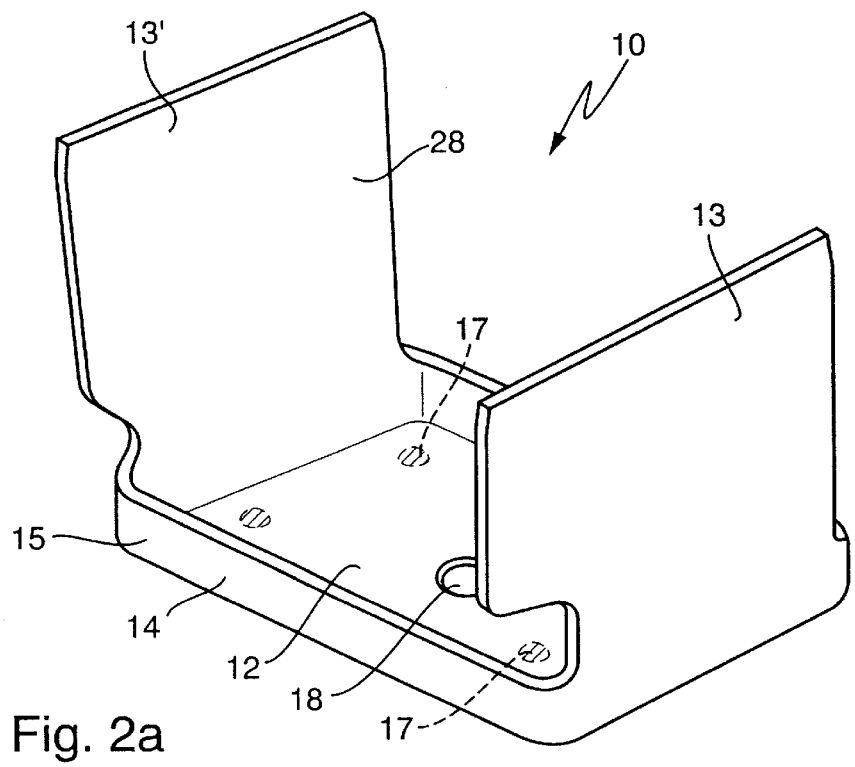
FIG. 2a shows a perspective view of the basic elements of the stiffening structure.

The basic element 10 is illustrated in detail in FIG. 2a. It is an extruded part including galvanized steel plate having an approximately rectangular base plate 12 and two side walls 13, 13' which protrude approximately perpendicularly from the base plate 12. The edge 14 of the base plate 12 is provided with a peripheral rounded portion 15 which stiffens the base plate 12 against distortion. In the position in which the basic element 10 is joined to the cross member 1, the base plate 12 of the basic element 10 rests flat against the base 16 of the cross member 1 in the attachment region 2 and is connected there to the cross member by welding points 17. The base plate 12 of the basic element 10 has integrally formed in it a threaded connecting branch 18 which, in the position in which the basic element 10 is joined to the cross member 1, penetrates the leadthroughs 3 of the cross member 1 and the rear axle unit is screwed to it.

Figure 2B:
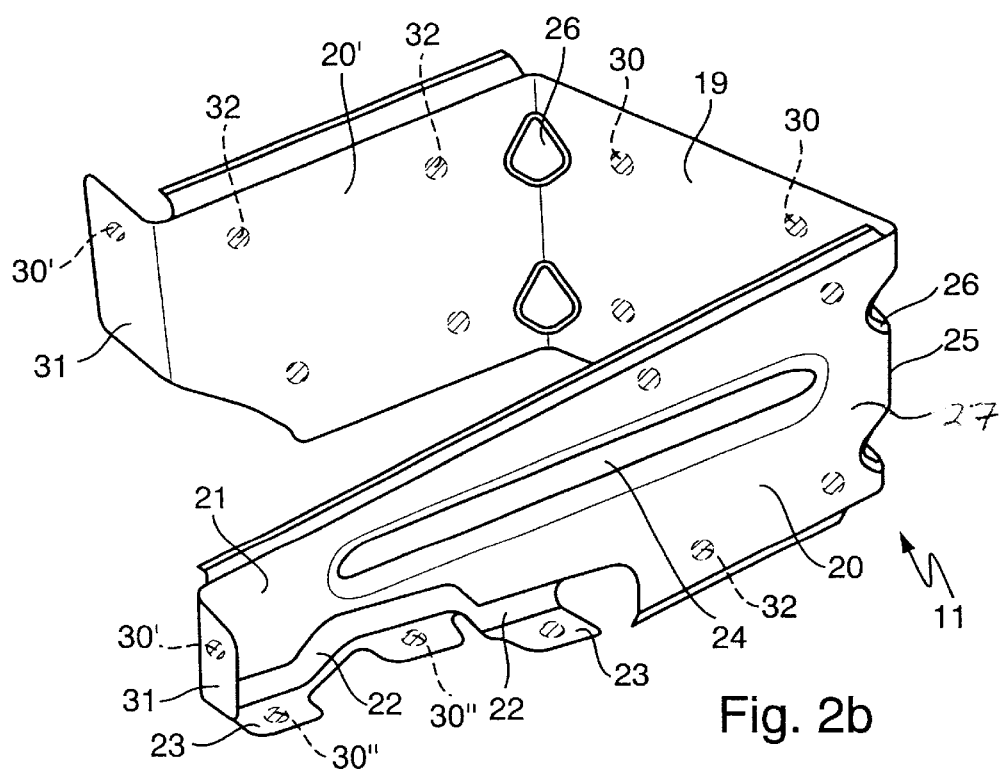
FIG. 2b shows the stiffening element in a perspective view.

The reinforcing element 11 is a bending part of galvanized steel plate and has, as can be seen from FIG. 2b, a U-shaped structure having an approximately rectangular central surface 19 from which two sides walls 20, 20' protrude approximately at right angles. The one side wall 20 is designed as a projecting lever 21 which, in the fitting position of the reinforcing element 11, covers both the attachment region 2 and the spring-receiving region 4 on the cross member 1. In its edge 22 which faces the spring-receiving region 4, the lever 21 has welding flanges 23 for the attachment of the lever 21 to the spring-receiving region 4 of the cross member 1. The lever 21 tapers in the direction of the spring-receiving region 4 in a manner corresponding to the profile of the bending moments. In order to increase the stiffness, the lever 21 is provided with an elongated bead 24 which runs in the longitudinal direction of the lever 21. Furthermore, the bending edges 25 are provided between the central surface 19 and side walls 20, 20' of the stiffening element 11 with notches 26 which result in an increase in strength of the U-shape of the stiffening element 11.

In order to install the stiffening structure 9 on the cross member 1, first of all the basic element 10 and stiffening element 11 are placed together into the cross member 1. The distance between the mutually remote outer surfaces 27 of the side walls 20, 20' of the stiffening element 11 corresponds to the distance between the mutually facing inner surfaces 28 of the side walls 13, 13' of the basic element 10, with the result that the stiffening element 11 can be nested into the basic element 10 in the manner shown in FIG. 1. The basic element 10 is then aligned with respect to the cross member 1 in such a manner that the threaded connecting branch 18 is situated in a predetermined position with respect to a fixing hole 29 on the cross member 1, so that the rear axle can be screwed-on in this predetermined position with respect to the cross member 1. The vertical position (i.e. alignment in the Z-direction) of the basic element 10 is determined here by the base 16 of the cross member 1, on which the base plate 12 of the basic element 10 rests, while the positioning of the threaded connecting branch 18 in the X- and Y-direction takes place by displacement of the basic element 10 in the attachment region 2 to the point which corresponds to the desired position; the diameter of the leadthrough 3 on the cross member 1, which leadthrough is penetrated by the threaded connecting branch 18, is selected to be correspondingly larger than the diameter of the threaded connecting branch 18, so that the displacement necessary for this adjustment can be carried out in the X- and Y-direction for all deviations which occur due to tolerances. The angular position of the basic element 10 in the cross member 1 is adjusted in such a manner that the stiffening element 11 guided from the side walls 13, 13' of the basic element 10 is aligned so that the central surface 19 of the stiffening element 11 comes to lie parallel to the side wall 6 of the cross member 1.

When the basic element 10 is brought into the desired position with respect to the fixing hole 29, the base plate 12 of the basic element 10 is connected to the base 16 of the cross member 1 via the welding points 17 (whose position is indicated by hatching in FIG. 2a). Displacements of the stiffening element 11 with respect to the cross member 1 are now limited by the side walls 13, 13' of the basic element 10, which side walls enclose the side walls 20, 20' of the stiffening element 11 from the outside. The stiffening element 11 is now displaced within the side walls 13, 13' of the basic element 10 until the central surface 19 of the stiffening element 11 comes to lie flat against the side wall 6 of the cross member 1 and, at the same time, the welding flanges 23 of the lever 21 of the stiffening element 11 come to lie in the spring-receiving region 4. The stiffening element 11 is now fixed in this position by the central surface 19 being connected to the side wall 6 of the cross member 1 by welding points 30. In the same spot-welding working step, the side walls 13, 20 and 13', 20' of the stiffening element 11 and basic element 10 are connected to one another, the flange 23 on the lever 21 of the stiffening element is connected to the spring-receiving region 4 and the edge-side flanges 31 on the side walls 20, 20' of the stiffening element 11 are welded to the opposite side wall 6' of the cross member 1; the position of the welding points 30', 30'', 32 which are set in the process is illustrated by hatching in FIG. 2b.

Figure 3:
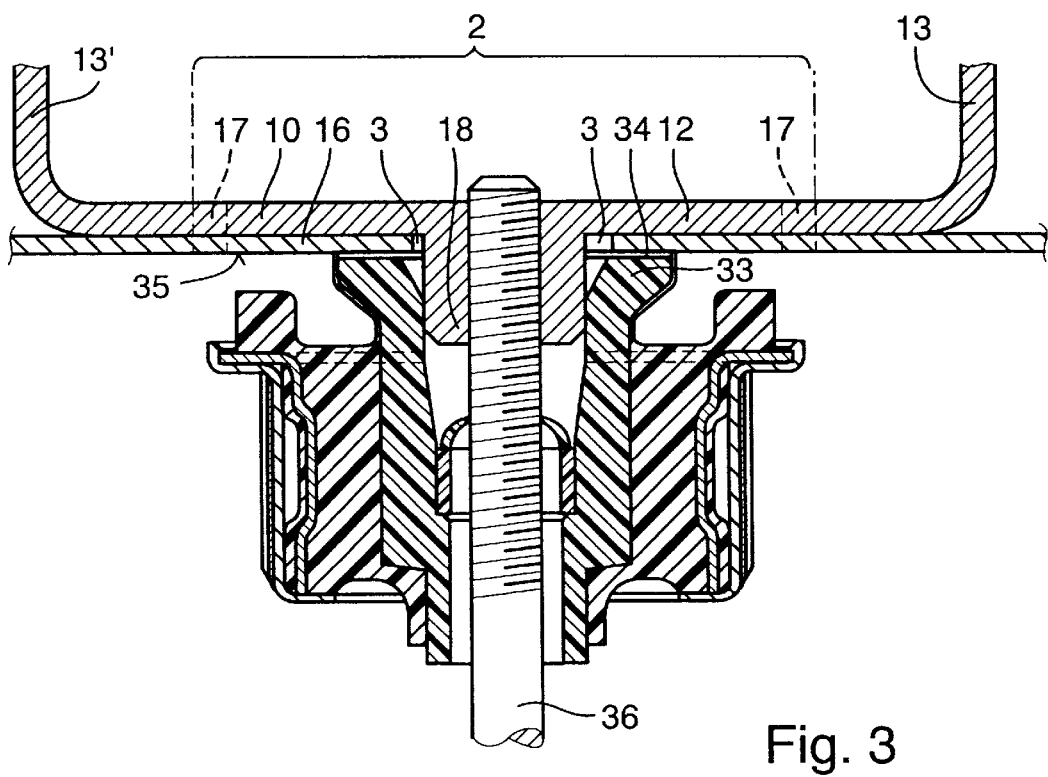
FIG. 3 shows a sectional view through the attachment region on the cross member.

If, during operation of the vehicle, high forces are introduced into the attachment regions 2 and the spring-receiving regions 4, these forces result in bending moments of the cross member 1 in these regions. The welding points 30, 30', 30'', 32, which connect the stiffening element 11 to the cross member 1 and to the side walls 13 of the basic element 10, can readily withstand loads of this type, since they are primarily subjected here to a shearing load (and only to a slight extent to a tensile load). Similarly, the welding points 17 which connect the base plate 12 of the basic element 10 to the base 16 of the cross member 1, are likewise subjected to only slight tensile and compression loads, since—as shown in FIG. 3—the threaded connecting branch 18, in the position in which it is joined to the rear axle, is held by an adapter 33 which is connected to the rear axle unit and whose top surface 34 rests flat against the outer wall 35 of the cross member 1. If the cross member 1 is connected in the attachment region 2 to the rear axle, the base plate 12 of the basic element 10 is pulled in the direction of the cross member 1 and adapter 33 by the attachment screw 36; the welding points 17 which connect the base plate 12 of the basic element 10 to the cross member 1 are then used merely for fixing the basic element 10 with respect to rotations, and are therefore only subjected to a shearing load, but not to a tensile load.

The stiffening structure 9 formed by the basic element 10 and stiffening element 11 therefore forms a compact, box-like structure which is fixed on all sides and which, on the one hand, reinforces the attachment region 2, and on the other hand, supports the spring-receiving region 4 with respect to the attachment region 2. In the joined-together position, there are many flat overlapping regions between the cross member 1 and stiffening structure 9, which regions result in a local increase in strength and stiffness of the cross member 1. Furthermore, the side walls 13, 20 and 13', 20' of the basic element 10 and stiffening element 11, which side walls run parallel to one another and are connected to one another, produce double-walled stiffening ribs of the cross member 1 in the attachment region 2. This double-walled characteristic of the box-shaped reinforcing structure 9 results in a further increase in strength.

Although the exemplary embodiment shows a particularly simple stiffening structure which includes two sheet-metal parts 10, 11 lying one inside the other, the stiffening structure 9 can generally include any desired number of sheet-metal parts which are connected to one another and to the cross member 1 by spot welding. The cross member 1 and stiffening structure 9 can be zinc-coated steel plates.

The above-described placing-in together and stepwise alignment and spot welding of the basic element 10 and stiffening element 11 in the cross member 1 is particularly favorable when a certain (fixed) spatial position of the stiffening structure 9 (and, in this case, of the threaded connection branch 18) with respect to a selected test point on the cross member 1 (in this case, the fixing hole 29) is desired. Otherwise, the stiffening structure 9 can be welded outside the cross member 1 and subsequently placed as a rigid fitting part into the cross member 1 and connected to the latter by spot welding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cross member of a motor-vehicle floor assembly, which, on two sides, has a connecting region which comprises an attachment region for attachment of a rear axle unit, and a spring-receiving region which is adjacent to the attachment region and is intended for fixing in place a helical spring, and the cross member being provided with a stiffening structure in the connecting region, wherein the stiffening structure is of box-shaped design and spans both the attachment region and the spring-receiving region, and the stiffening structure is connected to the cross member by spot welding.

2. Cross member according to claim 1, wherein the stiffening structure comprises a basic element and a stiffening element, the basic element has a base plate which is connected in the attachment region to the base of the cross member by welding points, and has two side walls protruding approximately perpendicularly from the base plate, and the stiffening element being of U-shaped design, overlaps in a planar manner in some sections over the side walls of the basic element and side walls of the cross member and is connected to the side walls by welding points.

3. Cross member according to claim 2, wherein the stiffening element has a projecting lever which overlaps both over the attachment region and over the spring-receiving region of the cross member, is arranged approximately perpendicularly with respect to the spring-receiving region, and is connected to the spring-receiving region in the overlapping region by welding points.

4. Cross member according to claim 3, wherein the projecting lever has a stiffening bead.

5. Cross member according to claim 2, wherein the stiffening element has bending edges which are provided with notched angular stiffening areas.

6. Cross member according to claim 2, wherein the basic element is an extruded part with a threaded connecting branch for receiving the rear axle unit integrally formed therein.

7. Cross member according to claim 1, wherein the cross member and stiffening structure are zinc-coated steel plates.

8. A cross member stiffening structure for a motor-vehicle floor assembly, with the cross member having on both lateral sides a connecting region, which includes an attachment region for attaching a rear axle unit and a spring-receiving region for fixing in place a helical spring, adjacent to the attachment region, said stiffening structure comprising:

a box-shaped structure arranged in the connecting region spanning both the attachment region and the spring-receiving region, and spot welds connecting the stiffening structure to the cross member.

9. A cross member stiffening structure according to claim 8, further comprising a basic element and a stiffening element, wherein the basic element has a base plate connected in the attachment region to a base of the cross member by welding points, and has two side walls arranged approximately perpendicular to the base plate, and wherein the stiffening element has a U-shaped design which overlaps in a planar manner in sections the side walls of the basic element and side walls of the cross member, and is connected to the side walls of the basic element and the cross member by welding points.

10. A motor-vehicle floor assembly, comprising:

a cross member with a connecting region on two sides, said connecting region including an attachment region for attachment of a rear axle unit and a spring-receiving region adjacent the attachment region for fixing a helical spring, and a stiffening structure of box-shaped design being provided in the connecting region spanning both the attachment region and the spring-receiving region and being connected to the cross member by spot welding.

11. A method of making a cross member of a motor-vehicle floor assembly, which said cross member has, on two sides, a connecting region comprising an attachment region for attachment of a rear axle unit, and a spring-receiving region adjacent to the attachment region for fixing in place a helical spring, comprising:

providing a stiffening structure in the connecting region of the cross member, and spot welding the stiffening structure to the cross member, wherein the stiffening structure has a box-shaped design and spans both the attachment region and the spring-receiving region.

12. A method of making a cross member assembly of a motor vehicle, comprising:

providing a cross member having, on two sides, a connecting region which includes an attachment region for attachment of a rear axle unit and a spring-receiving region adjacent to the attachment region for fixing in place a helical spring, providing a stiffening structure having a basic element and a stiffening element nested in the basic element, arranging the stiffening structure on the cross member, displacing the basic element relative to the cross member in such a manner that a rear axle mounting point on the basic element comes to lie at a predetermined position with respect to a fixing point on the cross member, connecting the basic element to the cross member by welding points, displacing the stiffening element relative to the basic element in such a manner that a central part of the stiffening element comes to lie substantially flat against a side wall of the cross member, and connecting the stiffening element to the basic element and the cross member by welding points, wherein the stiffening structure is a of box-shaped design and spans both the attachment region and the spring-receiving region.

* * * * *